(12) United States Patent
Ohms et al.

(10) Patent No.: US 8,997,566 B2
(45) Date of Patent: Apr. 7, 2015

(54) YAW RATE SENSOR

(75) Inventors: Torsten Ohms, Vaihingen/Enz-Aurich (DE); Burkhard Kuhlmann, Reutlingen (DE); Daniel Christoph Meisel, Vaihingen An der Enz (DE); Rolf Scheben, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 13/116,821

(22) Filed: May 26, 2011

(65) Prior Publication Data
US 2012/0011933 A1  Jan. 19, 2012

(30) Foreign Application Priority Data
Jun. 2, 2010 (DE) .......................... 10 2010 029 630

(51) Int. Cl.
  *G01C 19/56* (2012.01)
  *G01C 19/5747* (2012.01)
(52) U.S. Cl.
  CPC ................. *G01C 19/5747* (2013.01)
(58) Field of Classification Search
  CPC ........................ G01C 19/574; G01C 19/5747
  USPC .......................................... 73/504.12, 504.16
  See application file for complete search history.

(56) References Cited

U.S. PATENT DOCUMENTS

| | | | |
|---|---|---|---|
| 6,705,164 B2 * | 3/2004 | Willig et al. ............... | 73/504.12 |
| 7,389,690 B2 * | 6/2008 | Robert ........................ | 73/504.12 |
| 2010/0218605 A1 * | 9/2010 | Blomqvist et al. ......... | 73/504.12 |

FOREIGN PATENT DOCUMENTS

DE  102008042369  4/2010

* cited by examiner

*Primary Examiner* — John Chapman, Jr.
(74) *Attorney, Agent, or Firm* — Kenyon & Kenyon LLP

(57) ABSTRACT

A yaw rate sensor is described which includes a drive device, at least one Coriolis element, and a detection device having at least two detection elements which are coupled to one another with the aid of a coupling device, the drive device being connected to the Coriolis element for driving a vibration of the Coriolis element, and an additional coupling device which is connected to the detection device and to the Coriolis element for coupling a deflection in the plane of vibration of the Coriolis element to the detection device in a direction orthogonal to the vibration.

10 Claims, 8 Drawing Sheets

YAW RATE SENSOR

CROSS REFERENCE

The present application claims the benefit under 35 U.S.C. §119 of German Patent Application No. DE 102010029630.9, filed on Jun. 2, 2010, which is expressly incorporated herein by reference in its entirety.

FIELD OF THE INVENTION

The present invention relates to a yaw rate sensor.

BACKGROUND INFORMATION

Conventionally, a yaw rate sensor is mounted on a rotatable body in order to measure a yaw rate of a rotary motion of the body. A yaw rate sensor generally has two vibration-capable masses, which may also be referred to as partial vibrators. The two vibratable masses may also be referred to as a first vibrating mass and a second vibrating mass, which may be driven to vibrate in the opposite direction with the aid of a drive. This means that the first vibrating mass and the second vibrating mass vibrate phase-shifted by 180° (antiparallel) with respect to one another. Therefore, the vibrating motions of the first vibrating mass and of the second vibrating mass are also frequently referred to as vibrating motions in phase opposition, or also as an antiparallel mode.

When the body having the yaw rate sensor mounted thereon undergoes a rotary motion about a rotational axis which is not parallel to the vibration direction of the vibrating masses, and at the same time the two vibrating masses are excited to undergo their antiparallel vibrating motions, Coriolis forces act on the two vibrating masses. As a result of the Coriolis forces, the two vibrating masses are each deflected perpendicularly to their vibration direction. The two vibrating masses are deflected in opposite directions due to the antiparallelism of the vibrating motions of the two vibrating masses. Such an opposed vibration direction may also be referred to as an antiparallel detection vibration. This antiparallel detection vibration may be capacitively detected and converted into a yaw rate with the aid of an evaluation electronics system. The deflection of a vibrating mass is proportional to the Coriolis force acting on the vibrating mass. Thus, the deflection of the vibrating mass corresponds to the yaw rate of the rotary motion of the body.

Such a yaw rate sensor is described in German Patent Application No. DE 10 2008 042 369 A1, for example.

In addition to their two use modes, i.e., the drive mode and the detection mode, such yaw rate sensors may have additional vibration modes, so-called spurious modes. These spurious modes are superimposed during operation of the yaw rate sensor, and may result in false signals.

SUMMARY

An object of the present invention is to provide a yaw rate sensor which overcomes the known disadvantages and which in particular effectively suppresses spurious modes, thus avoiding false signals.

In accordance with the present invention, a yaw rate sensor is provided which includes a drive device, at least one Coriolis element, and a detection device having at least two detection elements. The yaw rate sensor may be a micromechanical yaw rate sensor, for example. The Coriolis element includes in particular a vibration-capable mass. A Coriolis element may also be referred to as a Coriolis vibrator. Multiple Coriolis elements may also preferably be provided, and in particular two Coriolis elements are formed. The drive device is also connected to the Coriolis element in such a way that the Coriolis element undergoes vibration. When multiple, in particular two, Coriolis elements are formed, the drive device is connected to the multiple Coriolis elements in such a way that the Coriolis elements undergo a vibration in the opposite direction. In particular in the case of two Coriolis elements, the two Coriolis elements undergo an antiparallel collinear drive vibration.

According to the present invention, the yaw rate sensor may also include a coupling device which couples the at least two detection elements to one another.

An example embodiment of a yaw rate sensor may also include an additional coupling device which is connected to the detection device and to the Coriolis element. This coupling device couples a deflection of the Coriolis element in the plane of vibration to the detection device in a direction orthogonal to the vibration. Thus, when the Coriolis element is appropriately deflected the at least two detection elements are likewise deflected. The detection device preferably includes one or multiple detection electrodes which in particular are connected to the at least two detection elements, so that a deflection of the detection elements also causes a deflection of the detection electrodes. This deflection may be capacitively detected, for example with the aid of an electrode which is stationary relative to the detection device, it being possible to also provide multiple stationary electrodes. This capacitive detection may be converted into a yaw rate, in particular with the aid of an evaluation electronics system. The stationary electrodes may also be referred to as counter electrodes. A deflection of the detection elements relative to the counter electrode(s) may also be referred to as a differential deflection.

An example embodiment of the yaw rate sensor according to the present invention is described below using two Coriolis elements as an example. However, the present invention is not limited thereto. In the simplest case, one Coriolis element is sufficient.

The three spatial axes, i.e., the x axis, the y axis, and the z axis, are defined as follows for the discussion below. The y axis is parallel to the vibration of the two Coriolis elements; i.e., the drive device excites the two Coriolis elements to undergo an antiparallel collinear drive vibration along the y axis. The x axis is orthogonal to the y axis and is situated in the plane of the drive vibration. The z axis is orthogonal to the x and the y axes, and is orthogonal to the plane of the drive vibration.

Thus, when the yaw rate sensor is rotated so that a yaw rate is formed which has a component perpendicular to the plane of vibration, i.e., a component in the z direction, such a yaw rate results in an action of force which causes an antiparallel and non-collinear deflection of the two Coriolis elements along the x axis. Such a deflection may also be referred to as a detection vibration. The Coriolis elements take part in this vibration, and with the aid of the additional coupling device transmit their motion to the detection device, in particular to the at least two detection elements. The detection elements may preferably also be referred to as detection vibrators. Since according to the present invention the at least two detection elements are coupled to one another with the aid of a coupling device, a parallel vibration mode of the at least two detection elements, i.e., in which the two detection elements vibrate in the same direction, i.e., in phase, has a higher frequency than an antiparallel vibration mode of the two detection elements; i.e., the two detection elements vibrate phase-shifted by 180° with respect to one another.

Thus, for the example yaw rate sensor according to the present invention, spurious modes, in particular a parallel detection mode and a parallel drive mode, are shifted to higher frequencies than for the conventional yaw rate sensors. In particular for the parallel detection mode, both Coriolis elements move in the same direction along the x axis. In particular for the parallel drive mode, the drive and the Coriolis elements move in the same direction along the y axis. This increased separation of use modes and spurious modes in the frequency range results in a lesser excitation of the spurious modes, and thus results in particularly stable operation.

In one preferred embodiment of the yaw rate sensor, the coupling device includes at least one double rocker. The double rocker may in particular include two rockers, in particular coupling rockers, which each couple the at least two detection elements to one another. The double rocker may in particular be referred to as a coupling element. The two rockers are preferably situated on the two detection elements in such a way that the two rockers clench, in particular at least partially clench, the two detection elements. A double rocker formed from such rockers may also be referred to as a double rocker clenching the two detection elements. When the detection elements, i.e., detection vibrators, are linearly deflected, the coupling rockers undergo a rotary motion. The result in particular is that the antiparallel vibration mode of the two detection elements has a lower frequency than the parallel vibration mode of the two detection elements.

In one exemplary specific embodiment of the yaw rate sensor, the two Coriolis elements are coupled to one another. Such a coupling may be achieved, for example, using a coupling spring; i.e., the two Coriolis elements are coupled with the aid of such a coupling spring. This offers the particular advantage that degeneration between a parallel and an antiparallel drive mode may be eliminated.

According to another exemplary specific embodiment of the yaw rate sensor, the drive device has two drives which are each connected to a Coriolis element. Such a drives may also be referred to as a drive vibrator. A drives preferably has a drive comb for an electrostatic drive. Such a drive comb in particular has an interdigital structure. In another exemplary embodiment, the two drives, in particular the two drive combs, are coupled to one another, preferably with the aid of a coupling spring. According to one preferred specific embodiment, the two drives, in particular the two drive combs, and also the two Coriolis elements are coupled to one another, for example with the aid of springs, in particular coupling springs, preferably torsion springs, bending springs, U springs, or S springs.

In yet another preferred specific embodiment of the yaw rate sensor, the yaw rate sensor includes a substrate. The drive device, the two Coriolis elements, and the detection device are preferably situated, in particular anchored, on the substrate. However, the two Coriolis elements and the detection device are situated on the substrate in such a way that the two Coriolis elements as well as the detection device, in particular the at least two detection elements, are able to freely vibrate. The use of a substrate offers the particular advantage that such a yaw rate sensor may be installed easily and with little complexity in devices such as mobile telephones, portable multimedia players, or portable computers, for example. In this regard, the use is not intended to be limited solely to the above-referenced devices. All devices are possible in which a yaw rate is to be determined.

In another exemplary embodiment of the yaw rate sensor, the at least two detection elements have a grid structure. The grid structure is preferably formed with the aid of multiple detection electrodes. In particular, the detection elements include multiple detection electrodes situated in parallel.

BRIEF DESCRIPTION OF THE DRAWINGS

The present invention is explained in greater detail below based on preferred specific embodiments, with reference to the figures.

DETAILED DESCRIPTION OF EXAMPLE EMBODIMENTS

Figure 1:
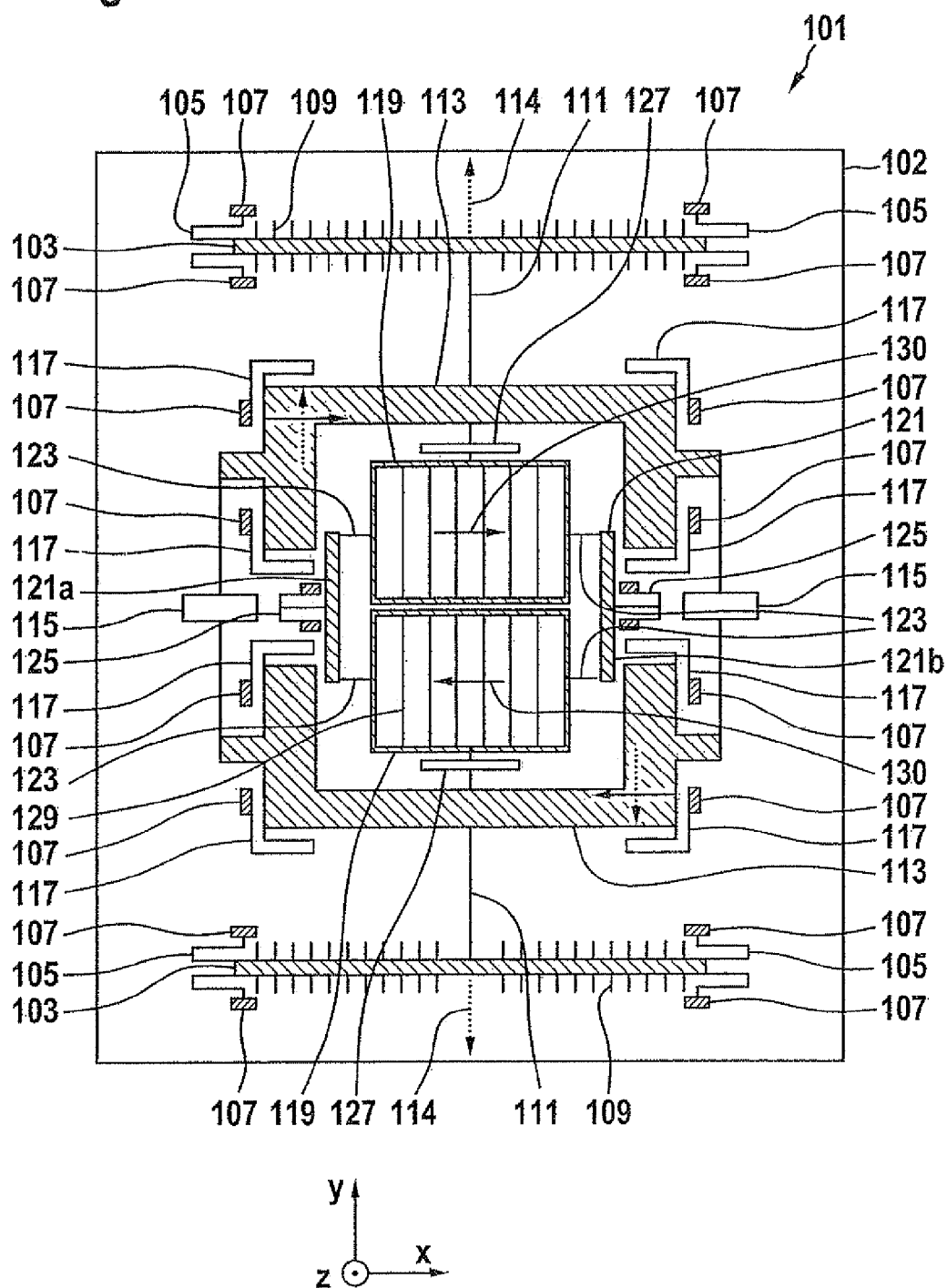
FIG. 1 shows a yaw rate sensor.

In the following discussion, identical elements are denoted by the same reference numerals in the figures.

FIG. 1 shows a yaw rate sensor 101 which includes a substrate 102. Substrate 102 has a rectangular shape. This means that substrate 102 is a rectangular substrate. In another exemplary embodiment which is not shown, substrate 102 may also have a square shape. In other exemplary embodiments which are not shown, substrate 102 may also have a triangular shape or a polygonal shape, in particular a pentagonal, hexagonal, or octagonal shape. In one particularly preferred specific embodiment which is not shown, substrate 102 may also have a circular or ellipsoidal shape. In another exemplary embodiment which is not shown, yaw rate sensor 101 may be designed as a micromechanical yaw rate sensor.

Yaw rate sensor 101 also has a drive device having two drives 103. The two drives 103 are situated in an upper and a lower region of substrate 102, respectively. Drives 103 are fastened to an anchor 107 on substrate 102 via a suspension arrangement 105. As a result of suspension arrangement 105, drives 103 are movable in the direction of the y axis. Drives 103 are preferably suspended on anchoring arrangement 107 with the aid of a spring as a suspension arrangement. The spring is preferably a U spring.

Drives 103 each include drive combs 109. Drive combs 109 are preferably designed to be an interdigital structure. Drive combs 109 are preferably configured for an electrostatic drive.

Drives 103 each have a coupling web 111, situated perpendicularly to drive combs 109, which couples each of drive means 103 to a Coriolis element 113. This means that coupling webs 111 connect the two drives 103 to the two Coriolis elements 113 for driving a vibration in the opposite direction of the two Coriolis elements 113. Coriolis elements 113 are suspended on anchors 107 via Coriolis suspension arrangement 117, anchors 107 being fastened to substrate 102. Coriolis suspension arrangement 117 has the particular result that Coriolis elements 113 are movable in the direction of the x and the y axes. Coriolis suspension arrangement 117 are preferably formed as bending springs, in particular as meandering bending springs. This means that the bending springs may have a meandering shape. In particular, the loops of the meander are parallel to the x and the y axes. A square meandering shape may preferably be provided. The meandering bending springs are designed to pass around corners, in a manner of speaking.

Arrows 114 denote, for example, a motion of the two Coriolis elements 113 during a half-phase, i.e., when the two drives 103 drive the two Coriolis elements 113 for a vibration in the opposite direction.

Yaw rate sensor 101 also has a detection device which includes two detection elements 119. The two detection elements 119 are coupled to one another with the aid of a coupling device. In the exemplary embodiment shown here, the coupling device includes a double rocker 121 which clenches the two detection elements 119 and which is formed from two coupling rockers 121a and 121b situated laterally of detection elements 119. The two coupling rockers 121a and 121b are each connected to detection elements 119 via two coupling bars 123. Coupling rockers 121a and 121b are situated, in particular anchored, on the substrate with the aid of detection substrate anchor 125.

The two detection elements 119 are also coupled to the two Coriolis elements 113 with the aid of an additional coupling device. In the exemplary embodiment shown here, the additional coupling device includes two coupling springs 127, each of which couples a Coriolis element 113 to a detection element 119. Thus, the detection device is connected to the two Coriolis elements 113 in such a way that a deflection in the plane of vibration of the two Coriolis elements 113, i.e., in the x-y plane, is coupled to the detection device in a direction orthogonal to the drive vibration, i.e., in the direction of the x axis. Thus, when the two Coriolis elements 113 are appropriately deflected in the direction of the x axis, the two detection elements 119 are likewise deflected, in particular in the direction of the x axis.

Detection elements 119 have multiple detection electrodes 129 situated in parallel. Detection electrodes 129 are enclosed on both sides by stationary electrodes (not shown), thus allowing a deflection of detection electrodes 129 to be capacitively detected. This deflection relative to the stationary electrodes, which may also be referred to as counter electrodes, may then be converted into a yaw rate with the aid of an evaluation electronics system (not shown).

During operation of yaw rate sensor 101, drives 103 excite the two Coriolis elements 113 to an antiparallel and collinear drive vibration along the y axis. Drive combs 109 as well as the two Coriolis elements 113 take part in this drive vibration. The detection device having the two detection elements 119, which may also be referred to as a detection vibrator, does not take part in this drive vibration. This is achieved in particular with the aid of suitable spring suspensions for substrate 102, and with the aid of suitable springs between the individual components.

A yaw rate of yaw rate sensor 101 having a component perpendicular to substrate 102, i.e., in the direction of the z axis, results in an action of force which causes an antiparallel and non-collinear deflection of Coriolis elements 113 along the x axis. This deflection along the x axis may also be referred to as a detection vibration. The two Coriolis elements 113 take part in this detection vibration and transmit their motion to the detection device, i.e., the detection vibrator, i.e., detection elements 119. Drive combs 109 do not take part in the detection vibration. Due to the coupling according to the present invention of the two detection elements 119 with the aid of two external rocker structures, i.e., double rocker 121, coupling rockers 121a and 121b undergo a rotary motion, while detection elements 119, however, move linearly along the x axis. As a result, the antiparallel vibration mode has a lower frequency than the parallel vibration mode. The differential deflection relative to the stationary counter electrodes is capacitively detected and is converted into a yaw rate with the aid of the evaluation electronics system. This deflection is indicated by arrows 130 in FIG. 1.

In the exemplary embodiment shown in FIG. 1, the two Coriolis elements 113 are coupled to one another with the aid of two Coriolis coupling springs 115. A particular result of Coriolis coupling springs 115 is that degeneration between the parallel and the antiparallel drive modes is eliminated. Coriolis coupling springs 115 are merely optional; i.e., yaw rate sensor 101 may also have no Coriolis coupling springs 115 of this type. This means that the two Coriolis elements 113 are not coupled to one another. In this regard, the two Coriolis elements 113 are decoupled in this exemplary embodiment (not shown). According to one exemplary embodiment, it may be provided that the two drives 103, in particular the two drive combs 109, are coupled to one another in addition to or as an alternative to a coupling of the two Coriolis elements 113. This coupling may preferably be implemented with the aid of one or multiple coupling springs.

In accordance with the present invention, the two detection elements 119 are coupled to one another with the aid of a coupling device, in the present case including a double rocker 121, for example, which may offer the particular advantage that spurious modes, in particular the parallel detection mode and the parallel drive mode, are shifted to higher frequencies than for the yaw rate sensors known heretofore. The two Coriolis elements 113 move in the same direction along the x axis in the parallel detection mode. In the parallel drive mode, drive means 103 and Coriolis elements 113 move in the same direction along the y axis.

Figure 2:
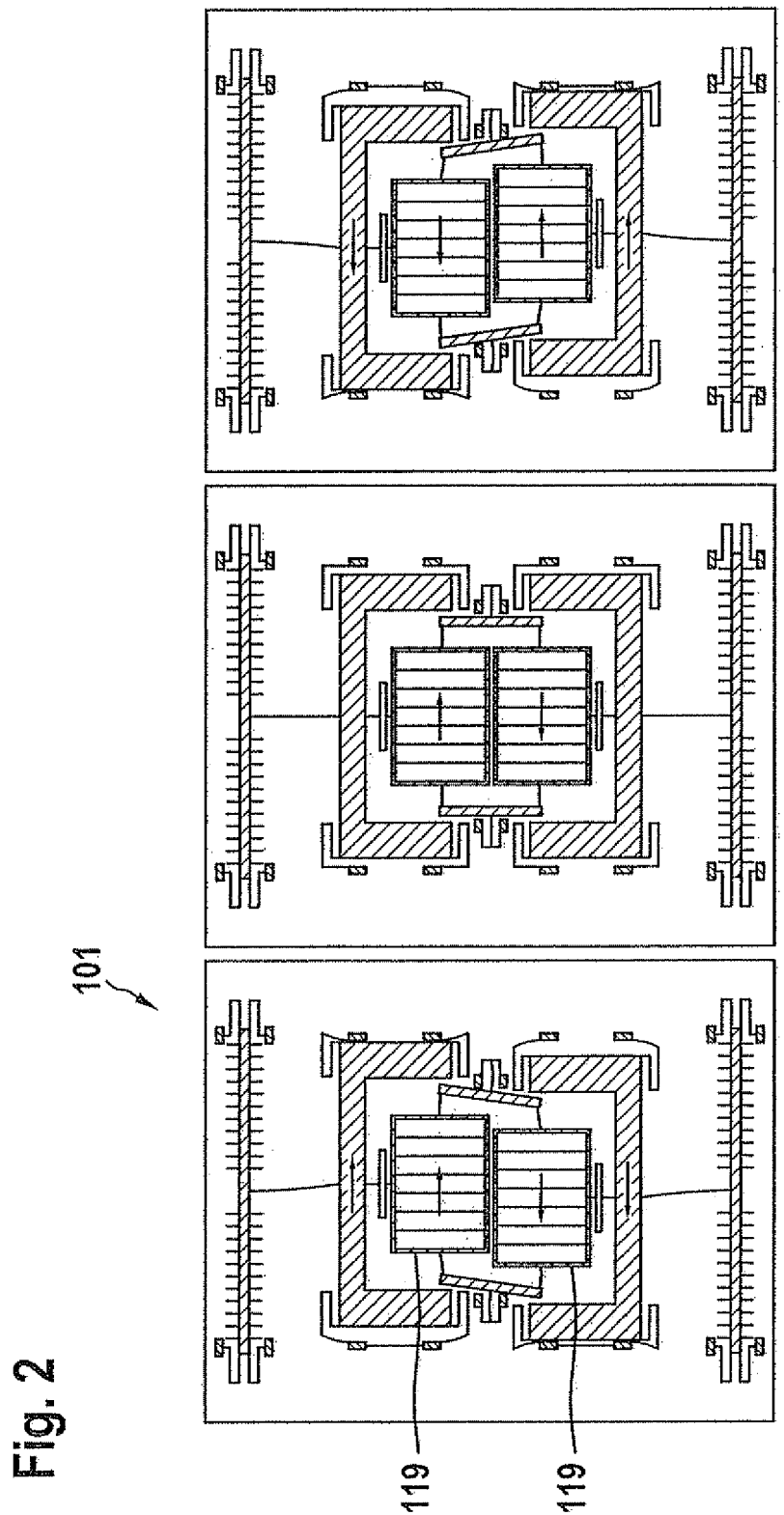
FIG. 2 shows a schematic illustration of the motion in the detection mode for the yaw rate sensor from FIG. 1.

FIG. 2 shows a schematic illustration of the motion in the detection mode for yaw rate sensor 101 from FIG. 1; for the sake of clarity not all elements have reference numerals. The detection mode is induced with the aid of the Coriolis force. A parallel motion of the two detection elements 119 in the same direction is suppressed. The corresponding motions are indicated by arrows in FIG. 2.

Figure 3:
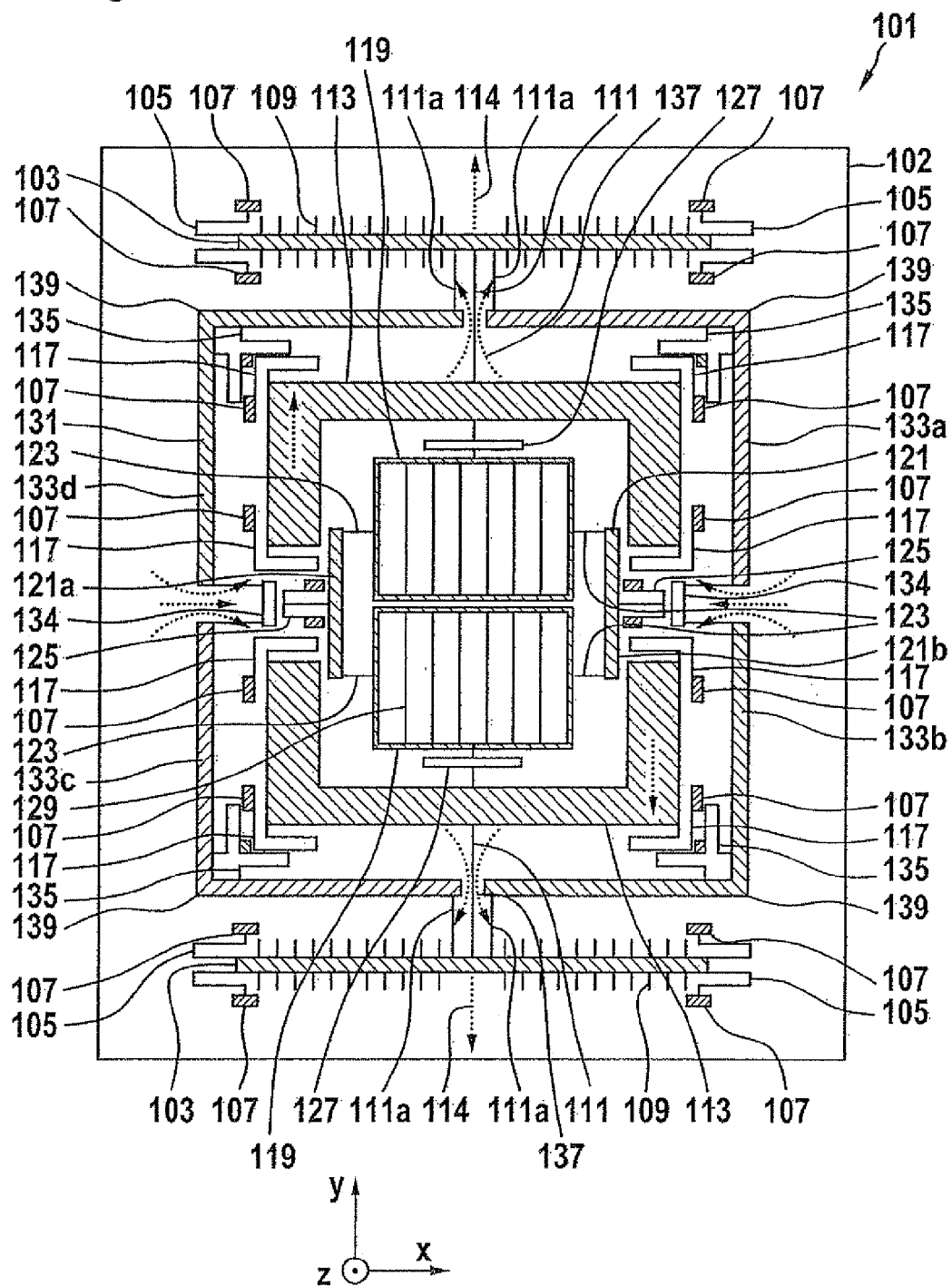
FIG. 3 shows the yaw rate sensor from FIG. 1, having a deflection frame.

FIG. 3 shows yaw rate sensor 101 from FIG. 1; in the exemplary embodiment shown in FIG. 3, yaw rate sensor 101 has a deflection frame 131. Deflection frame 131 is formed circumferentially around Coriolis elements 113 and the detection device having the two detection elements 119. Deflection frame 131 is formed by four legs 133a, 133b, 133c, and 133d, whereby legs 133a, 133b, 133c, and 133d each have a right-angled shape. Legs 133a and 133d are each coupled to corresponding legs 133b and 133c, respectively, via a leg coupling spring 134. In addition, legs 133a, 133b, 133c, and 133d are each coupled to drive combs 109 via an additional coupling web 111a, so that for a drive motion of drive combs 109, corresponding legs 133a, 133b, 133c, and 133d are also driven. Legs 133a, 133b, 133c, and 133d are suspended on the substrate with the aid of deflection frame suspension means 135, deflection frame suspension means 135 including springs and substrate suspensions. The suspension is configured in such a way that for a drive motion of drive combs 109, legs 133a, 133b, 133c, and 133d are able to undergo a motion about an imaginary center of rotation 139. This motion of legs 133a, 133b, 133c, and 133d is indicated by curved, dashed-line arrows 137.

With the aid of deflection frame 131, which couples drives 103 to one another, degeneration between the parallel (spurious mode) and the antiparallel (use mode) drive modes is eliminated, and the spurious mode becomes more rigid than the use mode. This is due to the differing rigidity of leg coupling spring 134, which may also be referred to as a transmission spring, with respect to stress in the same direction (bending) or in the opposite direction (shear).

Figure 4:
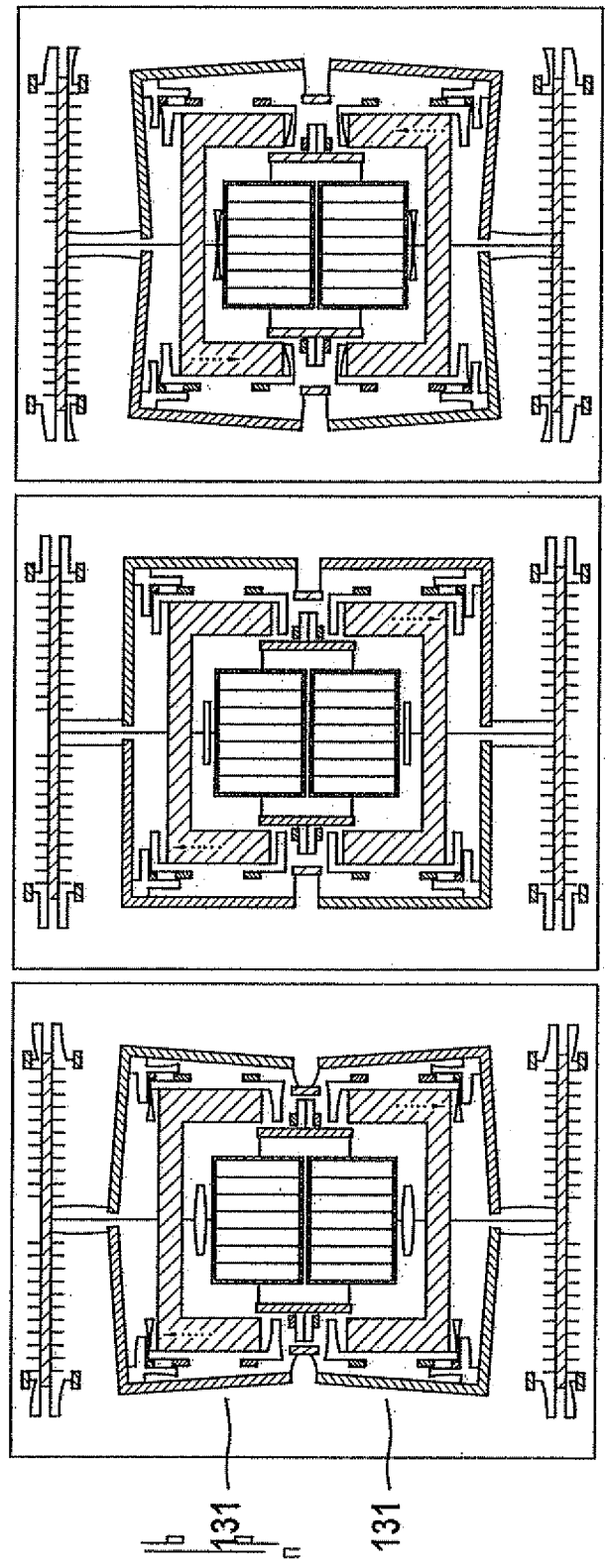
FIG. 4 shows a schematic illustration of the drive mode for the yaw rate sensor from FIG. 3.

FIG. 4 shows a schematic illustration of the drive mode for yaw rate sensor 101 from FIG. 3, which is excited by drives 103. Also shown is the corresponding motion of legs 133a, 133b, 133c, and 133d of deflection frame 131. Similarly to FIG. 2, for the sake of clarity not all reference numerals are plotted.

Figure 5:
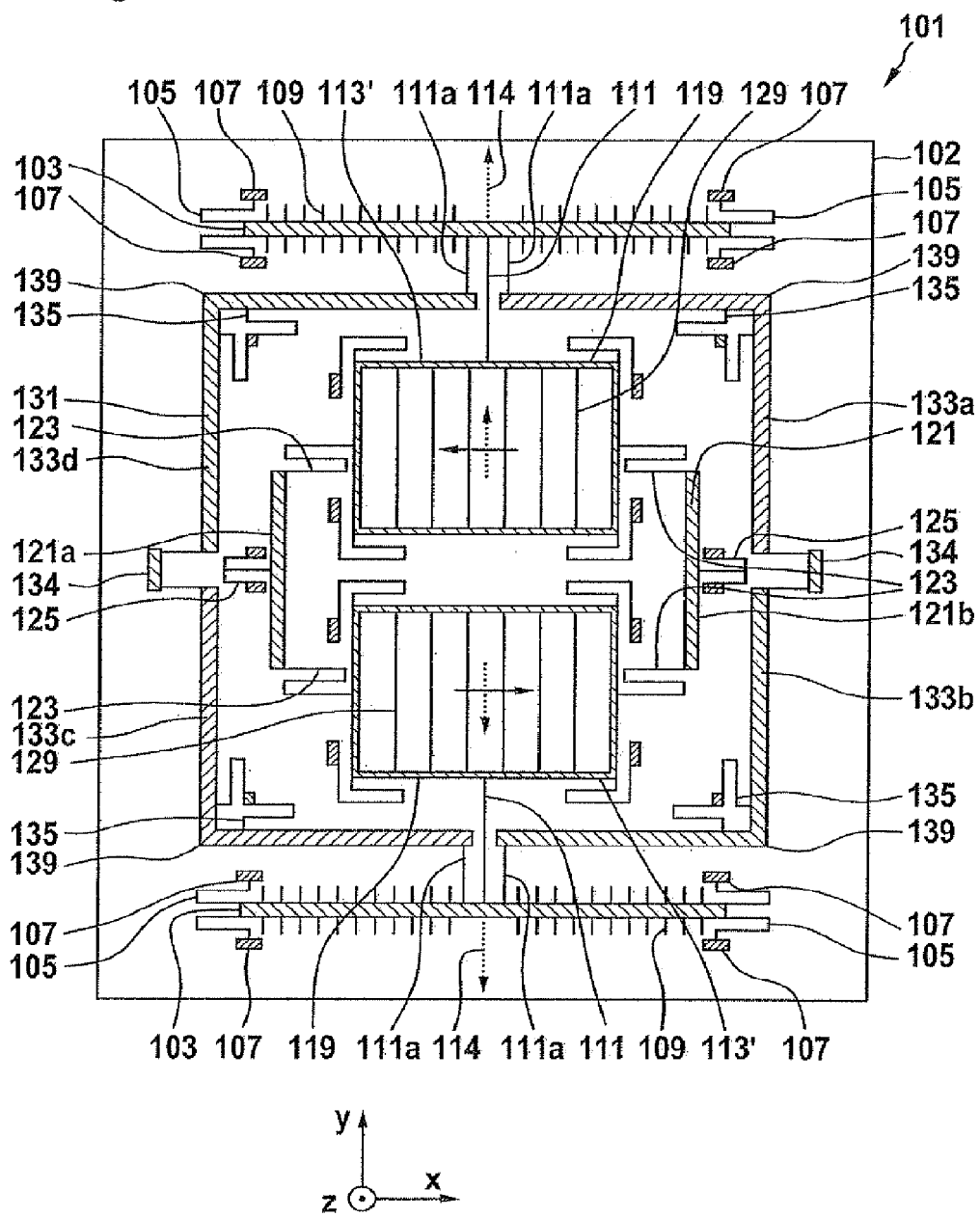
FIG. 5 shows another yaw rate sensor having a deflection frame.

FIG. 5 shows another specific embodiment of a yaw rate sensor 101 having a deflection frame 131. In this case, however, detection elements 119 and Coriolis elements 113' are integrally formed. This means that they form a unit and coincide with one another in a manner of speaking, and detection elements 119 as well as Coriolis elements 113' take part in the drive motion. This specific embodiment in particular has the advantage of a particularly compact design.

Figure 6:
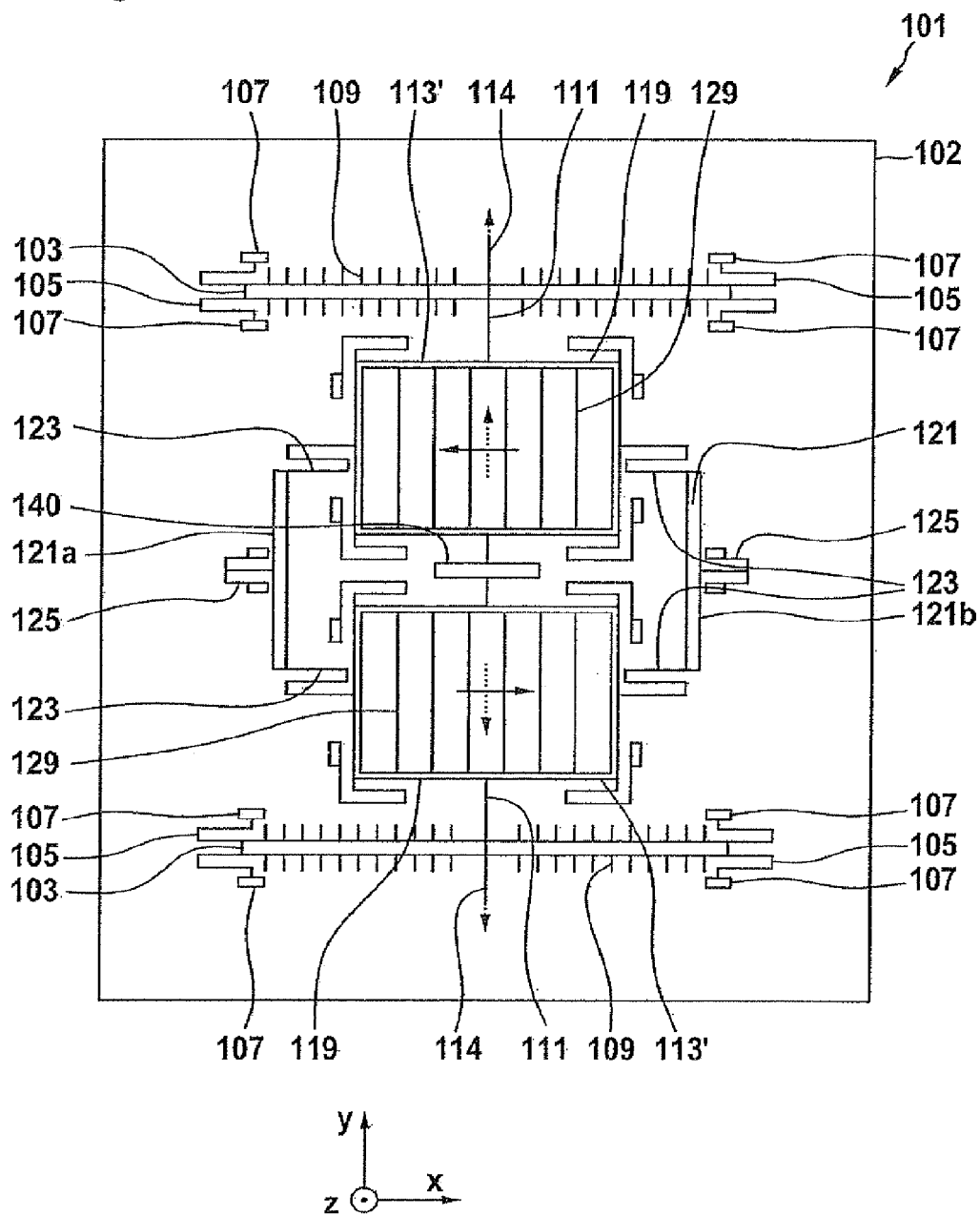
FIG. 6 shows the yaw rate sensor from FIG. 5, without the deflection frame.

FIG. 6 shows the yaw rate sensor from FIG. 5, in a specific embodiment without deflection frame 131. In the present case, the degeneration of the drive mode is eliminated with the aid of a coupling spring element 140 which is situated between the two detection elements 119 and Coriolis elements 113', which are integrally formed, for coupling same.

Figure 7:
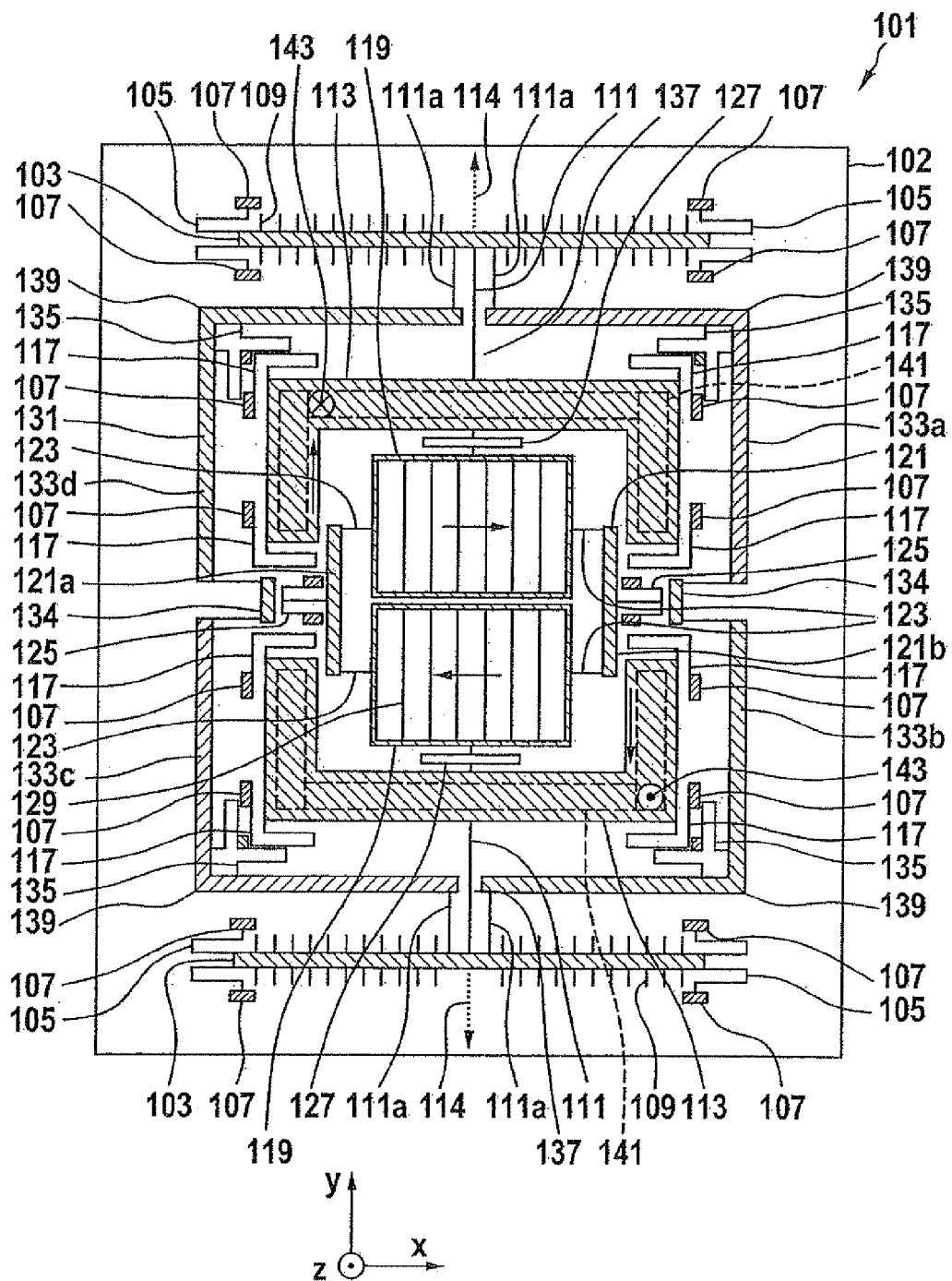
FIG. 7 shows another yaw rate sensor.

FIG. 7 shows another example of an exemplary embodiment of a yaw rate sensor 101; in this case, Coriolis elements 113 each have multiple additional detection electrodes 141 in addition to the features in the previous exemplary embodiments. Additional detection electrodes 141 are preferably situated beneath Coriolis elements 113. This advantageously allows a yaw rate about the z axis and about the x axis to be measured at the same time. Such a yaw rate sensor 101 may also be referred to as a dual-channel yaw rate sensor. When a yaw rate is present about the x axis, a Coriolis force 143 acts on Coriolis elements 113 in the z direction, and may be evaluated with the aid of additional detection electrodes 141.

Figure 8:
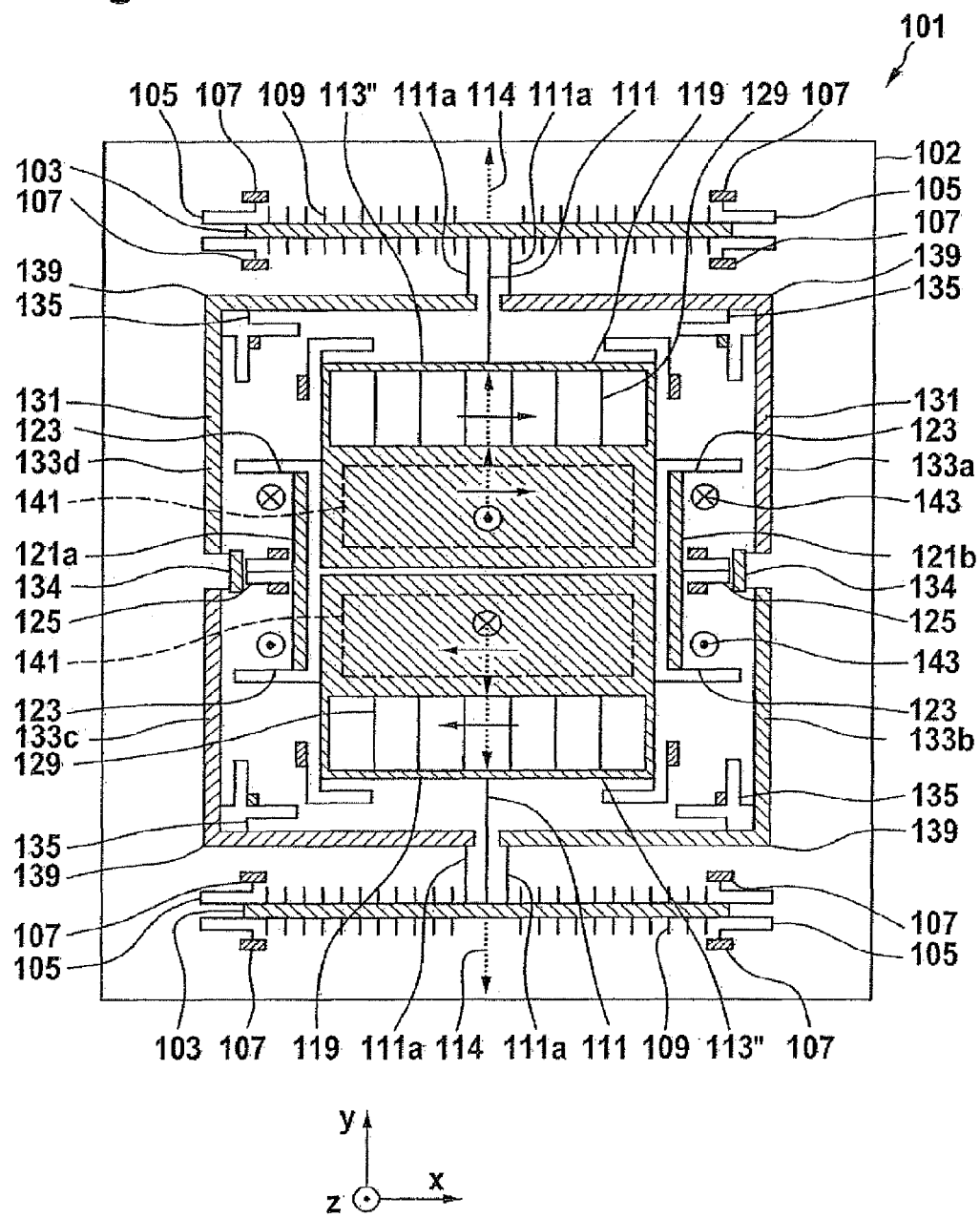
FIG. 8 shows yet another yaw rate sensor.

FIG. 8 shows yet another preferred exemplary embodiment of a yaw rate sensor 101. In this case, similarly to the exemplary embodiments shown in FIGS. 5 and 6, detection elements 119 and Coriolis elements 113" are integrally formed; i.e., they coincide with one another and take part in the drive motion as a unit. Similarly to the exemplary embodiment shown in FIG. 7, yaw rate sensor 101 in FIG. 8 has additional detection electrodes 141 which are enclosed by Coriolis elements 113" and detection elements 119. Only two additional detection electrodes 141 are shown here as an example. Multiple additional detection electrodes 141 may also preferably be provided. Quadrature equalization and electrostatic regenerative feedback may be advantageously achieved in this way. Detection electrodes 141 are preferably situated beneath Coriolis elements 113", in particular on the substrate. It may also be provided, for example, that detection electrodes 141 are situated beneath detection elements 119 and/or on additional elements of yaw rate sensor 101, in particular on substrate 102. Additional detection electrodes 141 are preferably situated beneath Coriolis elements 113". It is possible to measure yaw rates about the z and the x axes at the same time with the aid of yaw rate sensor 101 shown in FIG. 8. When a yaw rate is present about the x axis, a Coriolis force 143 acts on Coriolis elements 113" similarly to FIG. 7 in the z direction, and may be evaluated with the aid of additional detection electrodes 141. Clenching coupling rockers 121a and 121b act in a similar way for the motion in the x-y plane as well as for the motion out of the x-y plane. For the motion out of the x-y plane, once again the antiparallel motion has a lower frequency than the parallel motion, so that in particular a separation between interference mode and use mode is achieved. Yaw rate sensor 101 shown in FIG. 8 may also be referred to as a dual-channel yaw rate sensor.

According to another preferred specific embodiment which is not shown, additional detection electrodes 141 may also be integrated into a cover or situated on same. This cover preferably covers substrate 102, so that a yaw rate sensor housing is formed. The cover is preferably glued to substrate 102. For example, an inner space in the yaw rate sensor housing is evacuated. This means that a vacuum or negative pressure prevails in the inner space. Additional electrodes 141 which are situated in or integrated into such a cover may also be referred to as cover electrodes. A negative pressure in particular results in decreased motion resistance for the vibrating and rotating, i.e., moving, elements. In this way a lower drive voltage may advantageously be applied to the drive device.

What is claimed is:

1. A yaw rate sensor, comprising:
   a drive device;
   at least one Coriolis element, the drive device being connected to the Coriolis element for driving a vibration of the Coriolis element;
   a detection device having at least two detection elements which are coupled to one another with the aid of a coupling device; and
   an additional coupling device which is connected to the detection device and to the Coriolis element for coupling a deflection in a plane of vibration of the Coriolis element to the detection device in a direction orthogonal to the vibration;
   wherein the coupling device includes at least one double rocker.

2. The yaw rate sensor as recited in claim 1, wherein the yaw rate sensor includes two Coriolis elements.

3. The yaw rate sensor as recited in claim 2, wherein the two Coriolis elements are coupled to one another.

4. The yaw rate sensor as recited claim 2, wherein the drive device has two drives which are each connected to a Coriolis element.

5. The yaw rate sensor as recited in claim 4, wherein the two drives are coupled to one another.

6. The yaw rate sensor as recited in claim 1, wherein the at least one of the double rockers is connected to the two detection elements with the aid of at least one coupling bar.

7. The yaw rate sensor as recited in claim 1, wherein the Coriolis element has at least one electrode.

8. A yaw rate sensor, comprising:
   a drive device;
   two Coriolis elements, the drive device being connected to the two Coriolis elements for driving a vibration of the two Coriolis elements;
   a detection device having at least two detection elements which are coupled to one another with the aid of a coupling device; and
   a coupling spring element situated between the two detection elements and the two Coriolis elements,
      wherein the coupling device includes at least one double rocker;
   and
   wherein the two Coriolis elements and the at least two detection elements are integrally formed and together take part in the drive vibration.

9. A yaw rate sensor, comprising:
   a drive device;
   at least one Coriolis element, the drive device being connected to the Coriolis element for driving a vibration of the Coriolis element;

a detection device having at least two detection elements which are coupled to one another with the aid of a coupling device; and an additional coupling device which is connected to the detection device and to the Coriolis element for coupling a deflection in a plane of vibration of the Coriolis element to the detection device in a direction orthogonal to the vibration;

wherein the yaw rate sensor includes two Coriolis elements;

wherein the drive device has two drives which are each connected to a Coriolis element; and wherein the two drives are coupled to one another with the aid of a deflection frame which at least partially surrounds the Coriolis elements.

10. The yaw rate sensor as recited in claim 9, wherein the deflection frame is formed in at least two parts, and the at least two parts of the deflection frame are coupled to one another.

* * * * *